US010338311B2

(12) United States Patent
Ouyang et al.

(10) Patent No.: US 10,338,311 B2
(45) Date of Patent: Jul. 2, 2019

(54) PHOTONIC CRYSTAL ALL-OPTICAL MULTISTEP-DELAY AND-TRANSFORMATION LOGIC GATE

(71) Applicant: Zhengbiao Ouyang, Shenzhen, Guangdong (CN)

(72) Inventors: Zhengbiao Ouyang, Guangdong (CN); Quanqiang Yu, Guangdong (CN)

(73) Assignee: Zhengbiao Ouyang, Shenzhen (CN)

( * ) Notice: Subject to any disclaimer, the term of this patent is extended or adjusted under 35 U.S.C. 154(b) by 0 days.

(21) Appl. No.: 15/626,239

(22) Filed: Jun. 19, 2017

(65) Prior Publication Data
US 2017/0307823 A1 Oct. 26, 2017

Related U.S. Application Data

(63) Continuation of application No. PCT/CN2015/097838, filed on Dec. 18, 2015.

(30) Foreign Application Priority Data

Dec. 19, 2014 (CN) .......................... 2014 1 0804492

(51) Int. Cl.
*G02B 6/122* (2006.01)
*G02F 3/00* (2006.01)
(Continued)

(52) U.S. Cl.
CPC .......... *G02B 6/1225* (2013.01); *G02F 1/365* (2013.01); *G02F 3/00* (2013.01); *G02B 6/125* (2013.01); *G02B 2006/1213* (2013.01)

(58) Field of Classification Search
CPC .................. G02B 6/1225; G02B 6/125; G02B 2006/1213; G02F 1/365; G02F 3/00;
(Continued)

(56) References Cited

U.S. PATENT DOCUMENTS

2006/0062507 A1 3/2006 Yanik et al.
2017/0307960 A1* 10/2017 Ouyang .................... G02F 1/35

FOREIGN PATENT DOCUMENTS

CN 102226862 A 10/2011

OTHER PUBLICATIONS

2nd Office Action of counterpart Chinese Patent Application No. 201410804492.X dated Feb. 17, 2017.

* cited by examiner

*Primary Examiner* — Stephone B Allen
*Assistant Examiner* — Adam W Booher
(74) *Attorney, Agent, or Firm* — Zhihua Han

(57) ABSTRACT

The present invention discloses a photonic crystal (PhC) all-optical multistep-delay AND-transformation logic gate, which comprises a PhC-structure unit, an optical-switch unit (OSU), a wave-absorbing load, a NOT-logic gate, a D-type flip-flop (DFF) and a memory or delayer; an input port of a memory is connected with a first logic-signal $X_1$, and an output port of the memory is connected with the delay-signal-input port of the OSU; a second logic-signal $X_2$ is connected with the logic-signal-input port of the OSU; two intermediate-signal-output ports of the OSU are respectively the intermediate-signal-input port of the PhC-structure unit and the wave-absorbing load; a clock-signal CP is connected with the input port of a three-branch waveguide; the signal-output port of the PhC-structure unit is connected with the D-signal-input port of the DFF unit. The structure of the present invention is compact in structure and ease of integration with other optical-logic elements.

13 Claims, 4 Drawing Sheets

(51) Int. Cl.
*G02F 1/365* (2006.01)
*G02B 6/125* (2006.01)
*G02B 6/12* (2006.01)

(58) Field of Classification Search
CPC . G02F 3/02; G02F 3/024; G02F 3/028; B82Y
20/00; G06E 1/00; G06E 1/02; H03K
19/14
See application file for complete search history.

| A | B | C | Y |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |
| 1 | 1 | 0 | 1 |
| 1 | 1 | 1 | 1 |

FIG. 4

PHOTONIC CRYSTAL ALL-OPTICAL MULTISTEP-DELAY AND-TRANSFORMATION LOGIC GATE

CROSS-REFERENCE TO RELATED APPLICATION

This application is a continuation application of PCT Application No. PCT/CN2015/097838 filed on Dec. 18, 2015 which claims priority to Chinese Patent Application No. 201410804492.X filed on Dec. 19, 2014, the entire contents of which are hereby incorporated by reference.

FIELD OF THE INVENTION

The present invention relates generally to two-dimensional (2D) photonic crystal (PhC) all-optical multistep-delay AND-transformation logic gates.

BACKGROUND OF THE INVENTION

In 1987, the concept of PhC was proposed separately by E. Yablonovitch from United States Bell Labs who discussed how to suppress spontaneous radiation and by S. John from Princeton University who made discussions about photonic localization. A PhC is a material structure in which dielectric materials are arranged periodically in space, and is usually an artificial crystal consisting of two or more materials having different dielectric constants.

With the emergence of and in-depth research on PhCs, people can control the motion of photons in a PhC material more flexibly and effectively. In combination with traditional semiconductor processes and integrated circuit technologies, design and manufacture of PhCs and devices thereof have continually and rapidly marched towards all-optical processing, and PhC has become a breakthrough for photonic integration. In December 1999, the PhC was recognized by the American influential magazine Science as one of the top-ten scientific advances in 1999, and therefore has become a hot topic in today's scientific research field.

An all-optical logic device mainly includes an optical amplifier-based logic device, a nonlinear loop mirror logic device, a Sagnac interference-type logic device, a ring-cavity logic device, a multi-mode-interference logic device, an optical-waveguide-coupled logic device, a photoisomerized logic device, a polarization-switch optical logic device, a transmission-grating optical-logic device, etc. These optical-logic devices have the common shortcoming of large size in developing large-scale integrated optical circuits. With the improvement of science and technology in recent years, people have also done research and developed quantum optical-logic devices, nanomaterial optical-logic devices and PhC optical-logic devices, which all conform to the dimensional requirement of large-scale integrated optical circuits. For modern manufacturing processes, however, the quantum optical-logic devices and the nanomaterial optical-logic devices are very difficult to be manufactured, whereas the PhC optical-logic devices have competitive advantages in terms of manufacturing process.

In recent years, PhC logic devices have become a hot area of research drawing widespread attentions, and it is highly likely for them to replace the current widely-applied electronic logic devices in the near future. The PhC logic device can directly realize all-optical logical functions, such as "AND", "OR", "NOT" and the like, and is a core device for realizing all-optical computing. In the process of realizing all-optical computing, PhC logical function devices based on "AND", "OR", "NOT", "XOR" and the like have been successfully designed and researched, and various complex logic components are still needed for achieving the goal of all-optical computing.

SUMMARY OF THE INVENTION

The present invention is aimed at overcoming the defects of the prior art and providing a PhC all-optical multistep-delay AND-transformation logic gate compact in structure, strong in anti-interference capability and easy to integrate with other optical logic elements.

The technical proposal adopted by the invention to solve the technical problem is as follows:

A PhC all-optical multi-step delay AND-transformation logic gate in the present invention comprises a PhC structure unit, an optical-switch unit (OSU), a wave-absorbing load (WAL), a NOT-logic gate, a D-type flip-flop (DFF) and a memory or delayer; an input port of a memory is connected with a logic-signal $X_1$, and an output port of the memory is connected with the delay signal-input port of the OSU; logic-signal $X_2$ is connected with the logic-signal-input port of the OSU; two intermediate-signal-output ports of the OSU are respectively the intermediate-signal-input port of the PhC structure unit and the WAL; a clock-signal CP is input through the input port of a three-branch waveguide; the three output ports of the three-branch waveguide are respectively connected with a second clock-signal-CP-input port of the OSU, a first clock-signal-CP-input port of the PhC structure unit and the NOT-logic-gate-input port; the NOT-logic-gate-output port is connected with a third clock-signal-CP-input port of the DFF; the signal-output port of the PhC structure unit is connected with the D-signal-input port of the DFF.

The PhC structure unit is a 2D-PhC cross-waveguide nonlinear cavity, and the 2D-PhC cross-waveguide four-port network is formed by high-refractive-index dielectric pillars; a left port of the four-port network is a clock-signal-input port, a lower port is an intermediate-signal-input port, an upper port is a signal-output port, and a right port is an idle port; two mutually-orthogonal quasi-1D PhC structures are placed in two waveguide directions crossed at a center of a cross waveguide, a dielectric pillar is arranged in a middle of the cross waveguide, the dielectric pillar is made of a nonlinear material, a cross section of the dielectric pillar is square, polygonal, circular or oval; the dielectric constant of a rectangular linear pillar clinging to the central nonlinear pillar and close to the signal-output port is equal to that of the central nonlinear pillar under low-light-power conditions; the quasi-1D PhC structures and the dielectric pillar constitute a waveguide defect cavity.

The OSU is a 2×2 optical-selector switch (OSW) and includes a clock-signal-CP-input port, two system-signal-input ports and two intermediate-signal-output ports; and the two system-signal-input ports are respectively a delay-signal-input port and a logic-signal-input port; the two intermediate-signal-output ports are respectively the first and second intermediate-signal-output ports.

The DFF includes a third clock-signal-CP-input port, a D-signal-input port and a system-signal-output port; the signal output at the output port of the PhC structure unit is equal to the signal input at the D-signal-input port in the DFF.

The memory includes an input port and an output port; the output signal of the memory equals the input signal before k steps of the input of the memory; the delayer includes an input port and an output port; the output signal of the delayer has k-step delay relative to the input-signal thereof.

The memory or delayer provides the one of k-step delay.

The PhC structure is a (2k+1)×(2k+1) array structure, where k is an integer more than or equal to 3.

The cross section of a high-refractive-index dielectric pillar of the 2D PhC is circular, oval, triangular or polygonal.

A background filling material for 2D PhC is air or a different low-refractive-index medium with the refractive index less than 1.4.

The refractive index of the dielectric pillar in the quasi-1D PhC of the cross-waveguide is 3.4 or a different value more than 2, and the cross section of the dielectric pillar in the quasi-1D PhC is rectangular, polygonal, circular or oval.

Compared with the prior art, the present invention has the following advantages:
1. Compact in structure, and ease of manufacture;
2. Strong anti-interference capability, and ease of integration with other optical logic elements; and
3. High contrast of high and low logic outputs, and fast operation.

These and other objects and advantages of the present invention will become readily apparent to those skilled in the art upon reading the following detailed description and claims and by referring to the accompanying drawings.

BRIEF DESCRIPTION OF THE DRAWINGS

In FIG. 1, the indications are: PhC structure unit 01, first clock-signal-CP-input port 11, intermediate-signal-input port 12, idle port 13, output port 14, circular high-refractive-index linear-dielectric pillar 15, first rectangular high-refractive-index linear-dielectric pillar 16, second rectangular high-refractive-index linear-dielectric pillar 17, central nonlinear-dielectric pillar 18, first logic-signal $X_1$, second logic-signal $X_2$, clock-signal CP, OSU 02, delay-signal-input port 21, logic-signal-input port 22, first intermediate-signal-output port 23, second intermediate-signal-output port 24, WAL 03, third clock-signal-CP-input port, second clock-signal-CP-input port, NOT-logic gate 04, DFF 05, third clock-signal-CP-input port 51, D-signal-input port 52, system output port 53, memory or delayer 06.

FIG. 4 is a truth table of the logic functions of a 2D-PhC cross-waveguide nonlinear cavity shown in FIG. 1.

The present invention is more specifically described in the following paragraphs by reference to the drawings attached only by way of example.

DETAILED DESCRIPTION OF THE EMBODIMENTS

The terms a or an, as used herein, are defined as one or more than one, The term plurality, as used herein, is defined as two or more than two. The term another, as used herein, is defined as at least a second or more.

Figure 1:
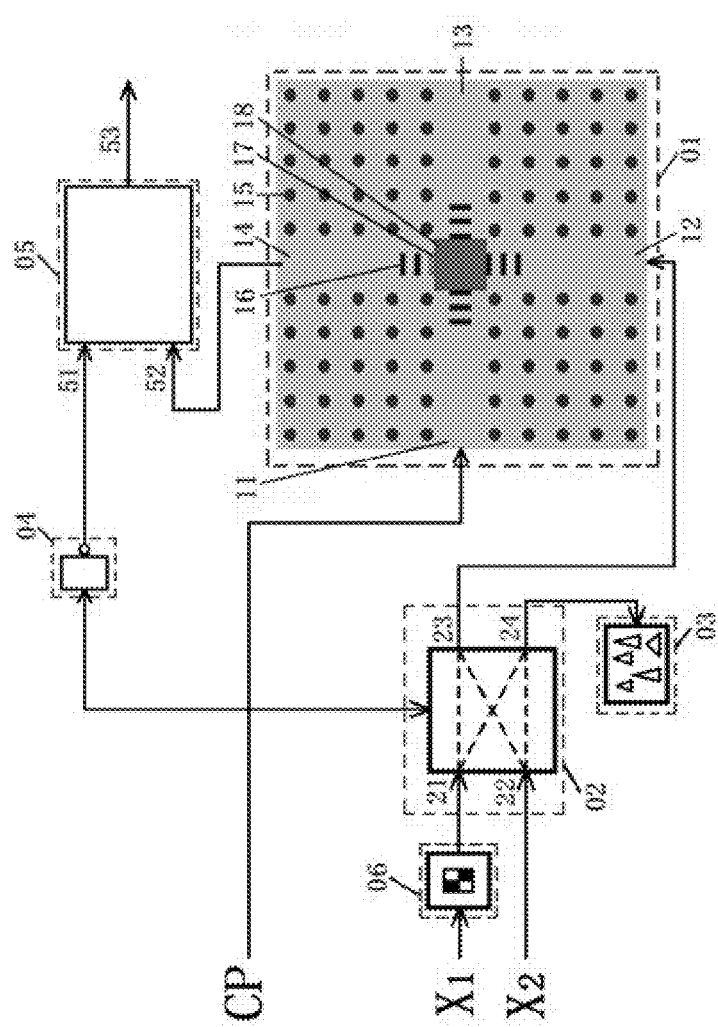
FIG. 1 is a structural schematic diagram of a PhC all-optical multistep-delay AND-transformation logic gate of the present invention.

As shown in FIG. 1, the PhC all-optical multistep-delay AND-transformation logic gate of the present invention includes a PhC structure unit 01, an OSU 02, a WAL 03, a NOT-logic gate 04, a DFF 05 and a memory or delayer 06; the PhC structure unit 02 is a 2D-PhC cross-waveguide nonlinear cavity and is arranged behind the OSU, the background filling material for the 2D PhC is air or a different low-refractive-index medium with a refractive index less than 1.4, the cross section of the high-refractive-index dielectric pillar of the 2D PhC is circular, oval, triangular or polygonal, the 2D-PhC cross-waveguide nonlinear cavity is a 2D-PhC cross-waveguide four-port network formed by high-refractive-index dielectric pillars, the four-port network has a four-port PhC structure, the left port is a clock-signal-input port the lower port is an intermediate-signal-input port, the upper port is a signal-output port, and the right port is an idle port; two mutually-orthogonal quasi-1D PhC structures are placed in two waveguide directions crossed at the center of a cross waveguide, the cross section of the dielectric pillar in the quasi-1D PhC is rectangular, polygonal, circular or oval, and the refractive index of the dielectric pillar is 3.4 or a different value more than 2, an dielectric pillar is arranged in the middle of the cross waveguide, the dielectric pillar is made of a nonlinear material, the cross section of the dielectric pillar is square, polygonal, circular or oval, and the quasi-1D PhC structures and the dielectric pillar constitute a waveguide defect cavity. The lattice constant of the 2D-PhC array is d, and the array number is 11×11; the circular high-refractive-index linear-dielectric pillar 15 is made of a silicon (Si) material, and has a refractive index of 3.4 and a radius of 0.18d; the first rectangular high-refractive-index linear-dielectric pillar 16 has a refractive index of 3.4, long sides of 0.613d and short sides of 0.162d; the second rectangular high-refractive-index linear-dielectric pillar 17 has a dielectric constant being the same as that of a nonlinear-dielectric pillar under low-light-power conditions, and has a dimension equal to that of the first rectangular high-refractive-index linear-dielectric pillar 16; and the central square nonlinear-dielectric pillar 18 is made of a Kerr type nonlinear material, and has a side length of 1.5d, a dielectric constant of 7.9 under low-light-power conditions and a third-order nonlinear coefficient of $1.33 \times 10^{-2}$ μm$^2$/V$^2$. Twelve rectangular high-refractive-index linear-dielectric pillars and one square nonlinear-dielectric pillar are arranged in the center of the 2D-PhC cross-waveguide nonlinear cavity in the form of a quasi-1D PhC along longitudinal and transverse waveguide directions, the central nonlinear-dielectric pillar clings to the four adjacent rectangular linear-dielectric pillars and the distance there between is 0, every two adjacent rectangular linear-dielectric pillars are spaced 0.2668 d from each other, and the dielectric constant of a rectangular high-refractive-index linear-dielectric pillar clinging to the central nonlinear-dielectric pillar and close to the signal-output port is equal to that of the central nonlinear-dielectric pillar under low-light-power conditions; the OSU 02 is a 2×2 OSW controlled by a clock-signal CP, used for controlling and selecting a logic-signal for outputting, and includes a second clock-signal-CP-input port, two system signal-input ports and two intermediate-signal-output ports; and the two system-signal-input ports are respectively a delay-signal-input port and a logic-signal-input port, and two intermediate-signal-output ports are respectively a first intermediate-signal-output port and a second intermediate-signal-output port. The memory 06 includes an input port and an output port; the output-signal of the memory equals the input signal before k steps of the input of the memory; the delayer includes an input port and an output port; the first logic-signal $X_1$ is connected with the input port of the memory 06, the memory or delayer is the one of k-step delay, and is arranged between the input port of the system and the OSU, an input signal of a k-step delayed memory is a logic-signal $X_1$ (n), and an output of the k-step delayed memory is a delay-signal $X_1$ (n−k), an output port of the memory 06 inputs the delay-signal $X_1$ (n−k) to the input port 21 of the delay-signal of the OSU 02, i.e., an input-signal of the input port 21 of the delay-signal of the OSU 02 is $X_1$ (n−k), the memory 06 is used for storing and outputting an input-signal input into the memory before k steps; and the output signal of the delayer has k-step delay relative to the input-signal thereof; the second logic-signal $X_2$ is connected with the logic-signal input port of the OSU 02, the first intermediate-signal-output port 23 of the OSU 02 is connected with the intermediate-signal-input port 12 of the PhC structure unit 01, the second intermediate-signal-output port 24 of the OSU 02 is connected with the WAL 03, the WAL is used for absorbing light waves entering it; the DFF 05 includes a third clock-signal-input port, a D-signal-input port and a system-signal-output port; a clock-signal CP is input through the input port of a three-branch waveguide, the first output port of the three-branch waveguide is connected with the second clock-signal-CP-input port of the OSU 02, the second output port of the three-branch waveguide is connected with the first clock-signal-CP-input port 11 of the PhC structure unit 01, and the third output port of the three-branch waveguide is connected with the input port of the NOT-logic gate 04; the output port of the NOT-logic gate 04 is connected with the third clock-signal-CP-input port 51 of the DFF 05; the NOT-logic gate 04 is arranged between the clock-signal-CP-input port and DFF 05, and is used for performing NOT-logic operation on the clock-signal CP and projecting the clock-signal CP to the third clock-signal-input port 51 of the DFF; the signal-output port 14 of the PhC structure unit 01 is connected with the D-signal-input port 52 of the DFF 05, i.e., the signal output at the output port 14 of the PhC structure unit 01 is equal to the signal input of the D-signal-input port 52 of the DFF 05; the system-signal-output port 53 of the DFF 05 is the system signal-output port of the PhC all-optical multistep-delay AND-transformation logic gate of the present invention.

The present invention can realize a multistep-delay AND-transformation logic gate function of all-optical logic-signals under the cooperation of unit devices such as the optical switch, based on the photonic band gap (PBG) characteristic, quasi-1D PhC defect state, tunneling effect and optical Kerr nonlinear effect of the 2D-PhC cross-waveguide nonlinear cavity shown by 01 of FIG. 1. Introduced first is the basic principle of the PhC nonlinear cavity in the present invention: a 2D PhC provides a PBG with a certain bandwidth, a light wave with its wavelength falling into this bandgap can be propagated in an optical path designed inside the PhC, and the operating wavelength of the device is thus set to a certain wavelength in the PBG; the quasi-1D PhC structure arranged in the center of the cross-waveguide and the nonlinear effect of the central nonlinear-dielectric together provide a defect state mode, which, as the input light wave reaches a certain light intensity, shifts to the operating frequency of the system, so that the structure produces the tunneling effect and signals are output from the output port 14.

Figure 2:
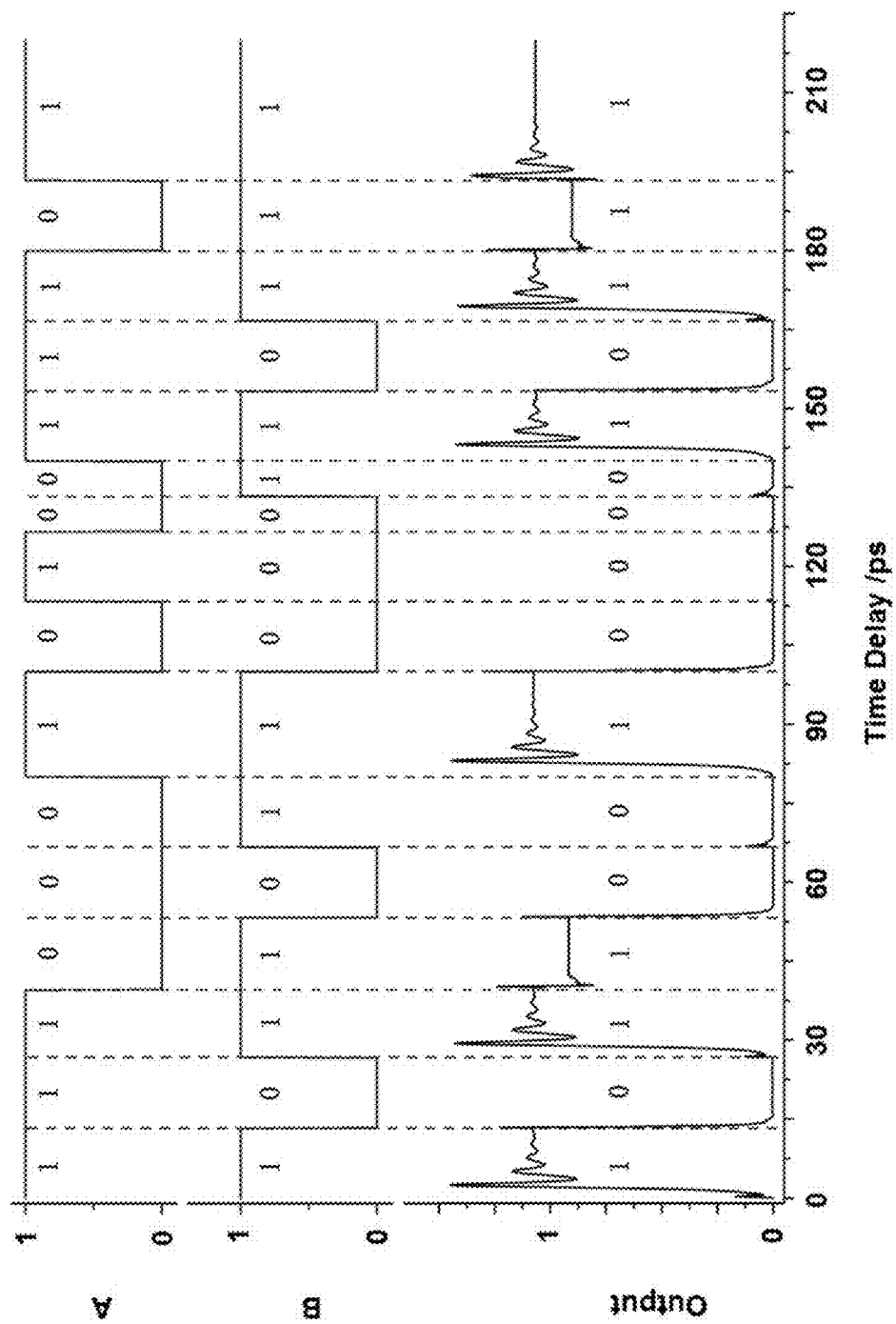
FIG. 2 is a waveform diagram of the basic logic functions of a PhC structure unit shown in FIG. 1 for the lattice constant d of 1 μm and the operating wavelength of 2.976 μm.

For the lattice constant d of 1 μm and the operating wavelength of 2.976 μm, referring to the 2D-PhC cross-waveguide nonlinear cavity shown by 01 in FIG. 1, for a signal A input from the port 11 and a signal B input from the port 12 as shown in the upper two diagrams in FIG. 2, a logic output waveform diagram of the 2D-PhC cross-waveguide nonlinear cavity of the present invention can be obtained as indicated by the lower part in FIG. 2 can be obtained. A logic operation truth table shown in FIG. 4 can be obtained according to the logic operation characteristic shown in FIG. 2. In FIG. 4, C is current state $Q^n$, and Y is signal output at the output port 24 of the PhC structure unit 01—the next state $Q^{n+1}$. A logic expression of the structure can be obtained according to the truth table:

$$Y=AB+BC \quad (1)$$

That is $$Q^{n+1}=AB+BQ^n \quad (2)$$

According to the basic logic operation characteristic of the above 2D-PhC cross-waveguide nonlinear cavity, the logic output of the previous step serves as a logic input of the nonlinear cavity itself to realize logic functions.

As shown in FIG. 1, for CP=1, the OSW turns the input signal $X_1$ (n−k) at the delay-signal-input port 21 to the first intermediate-signal-output port 23 of the OSW, and the input-signal $X_1$ (n−k) is further projected to the intermediate-input-signal-input port, 12 of the PhC structure unit 01, i.e., the input-signal of the intermediate-signal-input port 12 of the PhC structure unit 01 is equal to the input-signal $X_1$ (n−k) of the delay-signal-signal input port 21; simultaneously, the OSW turns the logic-signal $X_2$ (n) at the logic-signal-input port 22 to the second intermediate-signal-output port 24 of the OSU 02, and the logic-signal $X_2$ (n) is further projected to the WAL 03.

For CP=0, the OSW turns the input-signal $X_2$ (n+1) at the logic-signal $X_2$ input port 22 to the first intermediate-signal-output port 23 of the OSU 02, and the input-signal $X_2$ (n+1) is further projected to the intermediate-signal-input port 12 of the PhC structure unit 01, i.e., the input-signal of the intermediate-signal-input port of the PhC structure unit 01 is equal to the input-signal $X_2$ (n+1) of the logic-signal-input port; and simultaneously, the OSW turns the delay-signal $X_1$ (n−k+1) at the delay-signal-input port 21 to the second intermediate-signal-output port 24 of the OSU 02, and the input-signal $X_1$ (n−k+1) is further projected to the WAL 03.

With the cooperation described above, the multistep-delay AND-transformation logic function of all-optical logic-signals can be realized.

The PhC structure of the device in the present invention can be of a (2k+1)×(2k+1) array structure, where k is an integer more than or equal to 3. Design and simulation results will be provided below in an embodiment given in combination with the accompanying drawings, wherein the embodiment is exemplified by an 11×11 array structure and a lattice constant d of 0.5208 μm.

The OSW operates as follows under the control of a clock-signal CP:

At a moment $t_n$, CP is made equal to 1, the OSW turns the delay-signal $X_1$(n−k) at the delay-signal-input port 21 to the first intermediate-signal-output port 23 (Notice: for simplicity above and in the following, $X_i(t_n)$ is represented by $X_i(n)$ where i and n are integers), and the delay-signal $X_1$(n−k) is further projected to the intermediate-signal-input port 12 of the PhC structure unit 01; the OSW turns the signal $X_2$(n) at the logic-signal-input port 22 to the second intermediate-signal-output port 24, and the signal $X_2$(n) is further projected to the WAL 03; the input signal at the clock signal input port 11 of the PhC structure unit 01 is synchronous with the clock-signal CP, i.e., A=CP=1; the output of the port 14 at this moment can be obtained from the expression (2):

$$Q^{n+1}=X_1(n-k) \quad (3)$$

At a moment $t_{n+1}$, CP is made equal to 0, the OSW turns the signal $X_1(n-k+1)$ at the delay-signal input-signal input port 21 to the second intermediate-signal-output port 24, and the delay-signal $X_1(n-k+1)$ is further projected to the WAL 03; and simultaneously, the OSW turns the signal $X_2(n+1)$ at the logic-signal $X_2$ input port 22 to the first intermediate-signal-output port 23, and the signal $X_2(n+1)$ is further projected to the intermediate-signal-input port 12 of the PhC structure unit 01; the input-signal at the clock-signal-input port 11 of the PhC structure unit 01 is synchronous with the clock-signal CP, i.e., A=CP=0; the output at the port 14 at this moment can be obtained from the expression (2):

$$Q^{n+1}=X_2(n+1)X_1(n-k) \quad (4)$$

The output at the output port 14 of the PhC structure unit 01 is equal to the input at the D-signal-input port 52 of the DFF, and it can be obtained from the expressions (3) and (4) that the input signal at the D-signal-input port 52 is $X_1(n-k)$ for CP=1 and is $X_2(n+1) X_1(n-k)$ for CP=0.

Because the second clock-signal-input port 51 of the DFF 05 is connected with the output of the NOT-logic gate 04, the system signal output of the DFF 05 follows with the input-signal D as CP=0; and for CP=1, the system output keeps the input-signal D of the previous moment. Thus, it can be known that the output $Q^{n+1}$ of the system output port 52 of the device in the present invention is $X_2(n+1) X_1(n-k)$ for CP=0; and at a next moment for CP=1, the system output keeps the output of the previous moment, i.e., the system output in a clock cycle is:

$$Q^{n+1}=X_2(n+1)X_1(n-k) \quad (5)$$

Hence, the device in the present invention can realize the multistep-delay AND-transformation logic function of two logic-signals. If the memory is changed into a k-step delayer, the same function can be realized.

For the operating wavelength of the device of 1.55 μm and the lattice constant d of 0.5208 μm for the PhC structure unit 01; the radius of the circular high-refractive-index linear-dielectric pillar 15 is 0.093744 μm; the long sides of the first rectangular high-refractive-index linear-dielectric pillar 16 are 0.3192504 μm, and the short sides are 0.0843696 μm; the size of the second rectangular high-refractive-index linear-dielectric pillar 17 is the same as that of the first rectangular high-refractive-index linear-dielectric pillar 16; the side length of the central square nonlinear-dielectric pillar 18 is 0.7812 μm, and the third-order nonlinear coefficient is $1.33 \times 10^{-2}$ μm$^2$/V$^2$; and the distance between every two adjacent rectangular high-refractive-index linear-dielectric pillars is 0.13894944 μm. Based on the above dimensional parameters, as the delay-signal $X_1(n-k)$ of the delay-signal-input port 21 of the OSW 02 and the signal $X_2(n)$ of the logic-signal port are input according to the waveforms shown in FIG. 2, a system output waveform diagram indicated at the lower part of FIG. 2 can be obtained under the control of the clock-signal CP. Hence, the system carries out AND-logic operation on the logic input quantity $X_2(n+1)$ and the logic input quantity $X_1(n-k)$ of the previous moment. That is, the multistep-delay AND-transformation logic function of two logic-signals is realized.

To sum up, a multistep-delay AND-transformation logic gate function of all-optical logic signals can be realized under the coordination of the NOT-logic gate and the DFF by adding a memory or delayer, an OSU and a WAL via the control of the clock-signal CP of the clock-signal-input port.

Figure 3:
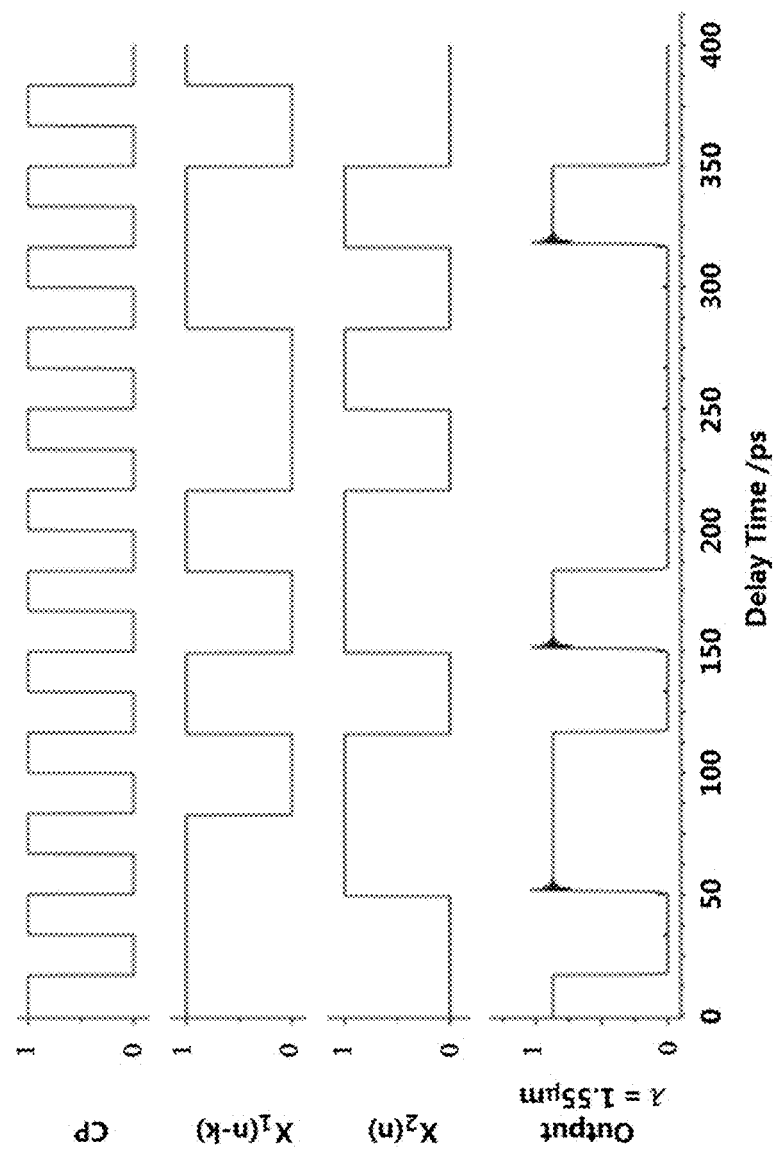
FIG. 3 is a waveform diagram of two logic-signal multistep-delay AND-transformation logic function of the present invention as the lattice constant d of 0.5208 μm and the operating wavelength of 1.55 μm.

With reference to FIG. 3, the device in the present invention can realize the same logic function under different lattice constants and corresponding operating wavelengths by scaling.

In the logic-signal processing in an integrated optical circuit, self-convolution operation of a single logic-signal can be defined, and the above-mentioned AND logic operation of logic-signals is a basic operation of the self-convolution operation of logic-signals. The AND-transformation logic function of logic-signals realized in the present invention plays an important role in realizing self-correlation transformation or self-convolution operation of logic variables.

While the invention has been described in terms of various specific embodiments, those skilled in the art will recognize that the invention can be practiced with modification within the spirit and scope of the claims.

What is claimed is:

1. A photonic crystal (PhC) all-optical multistep-delay AND-transformation logic gate, comprising:
a PhC-structure unit, an optical-switch unit (OSU), a wave-absorbing load (WAL), a NOT-logic gate, a D-type flip-flop (DFF) and a memory or delayer; an input port of a memory is connected with a first logic-signal ($X_1$), and an output port of said memory is connected with a delay-signal-input port of said OSU; a second logic-signal ($X_2$) is connected with a logic-signal-input port of said OSU; two intermediate-signal-output ports of said OSU are respectively connected with an intermediate-signal-input port of said PhC-structure unit and said WAL; a clock-signal (CP) is connected with an input port of a three-branch waveguide; three output ports of said three-branch waveguide are respectively connected with a second clock-signal-CP-input port of the OSU, a first clock-signal-CP-input port of said PhC-structure unit and a NOT-logic-gate-input port; a NOT-logic-gate-output port is connected with a third clock-signal-CP-input port of said DFF; and a signal-output port of said PhC-structure unit is connected with a D-signal-input port of said DFF.

2. The PhC all-optical multistep-delay AND-transformation logic gate in accordance with claim 1, wherein said PhC-structure unit is a 2D-PhC cross-waveguide nonlinear cavity, and a 2D-PhC cross-waveguide four-port network is formed by high-refractive-index dielectric pillars, a left port of the four-port network is a clock-signal-input port, a lower port is an intermediate-signal-input port, an upper port is a signal-output port, and a right port is an idle port; two mutually-orthogonal quasi-1D PhC-structures are placed in two waveguide directions crossed at a center of the cross-waveguide, a dielectric pillar is arranged in a middle of said cross-waveguide, said dielectric pillar is made of a nonlinear material, a cross section of said dielectric pillar is square, polygonal, circular or oval; a dielectric constant of a rectangular linear-pillar clinging to the central nonlinear-pillar and close to the signal-output port is equal to that of said central nonlinear pillar under low-light-power conditions; the quasi-1D PhC structures and said dielectric pillar constitute a waveguide defect cavity.

3. The PhC all-optical multistep-delay AND-transformation logic gate in accordance with claim 2, wherein said PhC structure is a (2k+1)×(2k+1) array structure, where k is an integer more than or equal to 3.

4. The PhC all-optical multistep-delay AND-transformation logic gate in accordance with claim 2, wherein a cross section of a high-refractive-index dielectric pillar of said 2D-PhC is circular, oval, triangular or polygonal.

5. The PhC all-optical multistep-delay AND-transformation logic gate in accordance with claim 2, wherein a background filling material for 2D-PhC is a different low-refractive-index medium with a refractive index less than 1.4.

6. The PhC all-optical multistep-delay AND-transformation logic gate in accordance with claim 2, wherein a background filling material for 2D-PhC is air.

7. The PhC all-optical multistep-delay AND-transformation logic gate in accordance with claim 2, wherein a cross section of the dielectric pillar in the quasi-1D PhC is rectangular, polygonal, circular or oval.

8. The PhC all-optical multistep-delay AND-transformation logic gate in accordance with claim 2, wherein a refractive index of the dielectric pillar in the quasi-1D PhC of the cross-waveguide is a different value more than 2.

9. The PhC all-optical multistep-delay AND-transformation logic gate in accordance with claim 2, wherein a refractive index of the dielectric pillar in the quasi-1D PhC of the cross-waveguide is 3.4.

10. The PhC all-optical multistep-delay AND-transformation logic gate in accordance with claim 1, wherein said OSU is a 2×2 optical-selector switch and includes a clock-signal-CP-input port, two system signal-input ports and two intermediate-signal-output ports; and said two system signal-input ports are respectively a delay-signal-input port and a logic-signal-input port; said two intermediate-signal-output ports are respectively a first and a second intermediate-signal-output port.

11. The PhC all-optical multistep-delay AND-transformation logic gate in accordance with claim 1, wherein said DFF includes a third clock-signal-CP-input port, a D-signal-input port and a system-signal-output port; a signal output of the output port of said PhC-structure unit is equal to a signal input of the D-signal-input port of said DFF.

12. The PhC all-optical multistep-delay AND-transformation logic gate in accordance with claim 1, wherein said memory includes an input port and an output port; an output signal of the memory has an input signal before k steps of an input memory; the delayer includes an input port and an output port; an output signal of the delayer has k-step delay relative to an input signal thereof.

13. The PhC all-optical multistep-delay AND-transformation logic gate in accordance with claim 1, wherein said memory or delayer provides one of k-step delay.

* * * * *